US012691659B2

(12) United States Patent
Kogo

(10) Patent No.: US 12,691,659 B2
(45) Date of Patent: Jul. 28, 2026

(54) MAT MATERIAL, EXHAUST GAS PURIFICATION DEVICE, AND METHOD FOR PRODUCING MAT MATERIAL

(71) Applicant: IBIDEN CO., LTD., Ogaki (JP)

(72) Inventor: Yuta Kogo, Takahama (JP)

(73) Assignee: IBIDEN CO., LTD., Ogaki (JP)

( * ) Notice: Subject to any disclaimer, the term of this patent is extended or adjusted under 35 U.S.C. 154(b) by 239 days.

(21) Appl. No.: 18/396,709

(22) Filed: Dec. 27, 2023

(65) Prior Publication Data

US 2024/0165913 A1 May 23, 2024

Related U.S. Application Data

(63) Continuation of application No. PCT/JP2022/024674, filed on Jun. 21, 2022.

(30) Foreign Application Priority Data

Jun. 30, 2021 (JP) ................................. 2021-109472

(51) Int. Cl.
| | |
|---|---|
| *B32B 5/12* | (2006.01) |
| *B01D 46/24* | (2006.01) |
| *B01D 53/94* | (2006.01) |
| *B32B 5/02* | (2006.01) |
| *B32B 29/02* | (2006.01) |

(Continued)

(52) U.S. Cl.
CPC ............ *B32B 5/12* (2013.01); *B01D 46/2462* (2013.01); *B01D 53/94* (2013.01); *B32B 5/022* (2013.01); *B32B 29/02* (2013.01); *B01D*

*2255/9155* (2013.01); *B01D 2258/01* (2013.01); *B01D 2271/02* (2013.01); *B01D 2279/30* (2013.01); *B32B 2262/02* (2013.01); *B32B 2262/108* (2013.01); *B32B 2581/00* (2013.01)

(58) Field of Classification Search
CPC ....... B32B 5/12; B32B 5/022; B32B 2581/00; B01D 46/2462; B01D 2255/9155; B01D 2279/30
See application file for complete search history.

(56) References Cited

U.S. PATENT DOCUMENTS 4,302,495 A * 11/1981 Marra ........................ B32B 5/12
428/110
6,660,359 B1 12/2003 Wirth et al.
(Continued)

FOREIGN PATENT DOCUMENTS

| CN | 112166213 | 1/2021 |
|---|---|---|
| JP | 2001-521847 | 11/2001 |

(Continued)

*Primary Examiner* — Joanna Pleszczynska
(74) *Attorney, Agent, or Firm* — MORI & WARD, LLP

(57) ABSTRACT

A mat material including: a base mat containing inorganic fibers and having a first main surface and a second main surface; and a sheet material disposed on at least one of the first main surface or the second main surface, wherein the sheet material is a stacked sheet material in which longitudinally oriented fibers and transversely oriented fibers are stacked, the sheet material has openings surrounded by the longitudinally oriented fibers and the transversely oriented fibers, and an average opening area of the sheet material is more than 0 mm²/piece and 0.7 mm²/piece or less.

14 Claims, 6 Drawing Sheets

(51) Int. Cl.
    *D04H 3/12*           (2006.01)
    *F01N 3/021*         (2006.01)

(56)             References Cited

U.S. PATENT DOCUMENTS

| | | |
|---|---|---|
| 2008/0047638 A1 | 2/2008 | Sugino |
| 2009/0087353 A1 | 4/2009 | Saiki |
| 2009/0114097 A1 | 5/2009 | Saiki |
| 2011/0158863 A1 | 6/2011 | Tomosue et al. |

FOREIGN PATENT DOCUMENTS

| | | |
|---|---|---|
| JP | 2008-051004 | 3/2008 |
| JP | 2009-085092 | 4/2009 |
| JP | 2009-113336 | 5/2009 |
| JP | 2011-137418 | 7/2011 |
| JP | 2020-033899 | 3/2020 |
| JP | 2020-033900 | 3/2020 |
| JP | 2020-084798 | 6/2020 |
| WO | WO 99/23370 | 5/1999 |
| WO | WO 2019/195406 | 10/2019 |

* cited by examiner

Longitudinal direction

Transverse direction

Longitudinal direction

Transverse direction

Longitudinal direction

Transverse direction

Longitudinal direction

Transverse direction

MAT MATERIAL, EXHAUST GAS PURIFICATION DEVICE, AND METHOD FOR PRODUCING MAT MATERIAL

TECHNICAL FIELD

The present invention relates to a mat material, an exhaust gas purification apparatus, and a method of producing a mat material.

BACKGROUND ART

The exhaust gas discharged from internal combustion engines (e.g., diesel engines) contains particulate matter (hereinafter also referred to as "PM"). Adverse effects of PM on the environment and human bodies have been problems in recent years. The exhaust gas also contains harmful gas components such as CO, HC, and NOx, which creates concerns about the impact of such harmful gas components on the environment and human bodies.

Thus, various exhaust gas purification apparatuses that collect PM in an exhaust gas or purify harmful gas components have been proposed. Such an exhaust gas purification apparatus includes an exhaust gas treatment body including a porous ceramic material such as silicon carbide or cordierite, a casing (a cylindrical member) for housing the exhaust gas treatment body, and a holding sealing material arranged between the exhaust gas treatment body and the casing. The holding sealing material is arranged mainly for, for example, preventing the exhaust gas treatment body from being damaged by contact with the casing that covers the outer periphery of the exhaust gas treatment body due to vibrations and impacts caused by the operation of automobiles or the like, and preventing exhaust gas leakage from a space between the exhaust gas treatment body and the casing.

The holding sealing material for use in such applications includes a mat material including inorganic fibers. The mat material including inorganic fibers is also used for applications such as insulation and soundproofing by being wrapped around pipes of automobiles and the like.

Patent Literature 1 discloses a composite mat which is wrapped around an exhaust gas treatment body (a catalytic converter) having a small diameter. According to the disclosure, the composite mat includes a layer of inorganic fibers, a binder, and a flexible sheet adhered to at least one side of the layer of inorganic fibers.

Patent Literature 2 discloses a holding sealing material including a protection sheet placed on a surface of a mat base material, wherein the protection sheet has in-plane elongation anisotropy.

Patent Literature 3 discloses a holding sealing material including a sheet material placed on at least one of a first main surface or a second main surface of a base member, wherein the sheet material has an opening in at least a portion of the surface.

Patent Literature 4 discloses a mat material including an oriented organic sheet placed on a surface of a base mat. The organic sheet includes at least two organic sheets, a first organic sheet and a second organic sheet, which are stacked together, and the orientation direction is different between the first organic sheet and the second organic sheet.

CITATION LIST

Patent Literature

Patent Literature 1: JP 2001-521847 T
Patent Literature 2: JP 2008-51004 A

Patent Literature 3: JP 2009-85092 A
Patent Literature 4: JP 2020-84798 A

SUMMARY OF INVENTION

Technical Problem

In Patent Literatures 1, 2, and 4, the sheets such as a flexible sheet are provided to prevent the mat material from being cracked at the time of wrapping.

In Patent Literature 3, the sheet material is provided to prevent scattering of inorganic fibers contained in the base material.

One of conventional methods of producing such a mat material is a punching method (also referred to as punching process) using a punching die having a punching blade.

In this method, a large laminated body in which a sheet-shaped member including inorganic fibers and a flexible sheet are attached to each other is prepared, and the laminated body is punched, whereby many mat materials can be obtained by one-time punching process.

The mat material has a long-side direction which is a wrapping direction, and a short-side direction which is perpendicular to the long-side direction.

When obtaining such mat materials from a single large laminated body, the following punching positions are combined in order to obtain as many mat materials as possible from the single large laminated body: a punching position where a mat material is punched out from the laminated body in a direction in which the longitudinal direction of the laminated body is the long-side direction of the mat material; and a punching position where a mat material is punched out from the laminated body in a direction in which the transverse direction of the laminated body is the long-side direction of the mat material.

In this case, two types of mat materials, which are different in terms of the orientation of the long-side direction of the mat material relative to the longitudinal or transverse direction of the laminated body, are obtained.

Here, when a sheet having elongation anisotropy is used, two types of mat materials are obtained, which are different in terms of relationship of the orientation of the long-side direction of the mat material with respect to the orientation of tensile strength of sheet.

Specifically, the following two types of mat materials are obtained: a mat material whose orientation of the long-side direction is aligned with the direction in which the tensile strength of the sheet is high (a hard mat material); and a mat material whose orientation of the long-side direction is aligned with the direction in which the tensile strength of the sheet is low (an easy mat material).

The hard mat material is one in which the orientation of the long-side direction of the mat material is aligned with the direction in which the tensile strength of the sheet is high. Thus, when such a mat material is wrapped around an exhaust gas treatment body or the like such that the long-side direction of the mat material is the wrapping direction, the resistance from tensile strength of the sheet is high, so that a force is required to wrap the mat material.

In contrast, the easy mat material is one in which the orientation of the long-side direction of the mat material is aligned with the direction in which the tensile strength of the sheet is low. Thus, when such a mat material is wrapped around an exhaust gas treatment body or the like such that the long-side direction of the mat material is the wrapping direction, the resistance from tensile strength of the sheet is low, so that a force is not required to wrap the mat material.

Mat materials are required to have certain wrapping properties according to product standards. A mat material whose wrapping properties are deviated from the standard value is treated as a defective product.

Thus, when two types of mat materials, a hard mat material and an easy mat material having different wrapping properties, are obtained from a single large laminated body, one of the mat materials is highly likely to be treated as a defective product.

In view of these circumstances, it is preferred that two types of mat materials obtained from a single large laminated body have comparable wrapping properties within standard values.

Even when the mat material is provided with a sheet such as a flexible sheet, if the sheet has a large opening area, the mat material may crack when wrapped around an exhaust gas treatment body or the like.

The present invention was made in view of the above problems, and aims to provide a mat material configured to have stable wrapping properties within standard values and capable of preventing or reducing cracking at the time of wrapping.

Solution to Problem

The mat material of the present invention includes: a base mat containing inorganic fibers and having a first main surface and a second main surface; and a sheet material disposed on at least one of the first main surface or the second main surface, wherein the sheet material is a stacked sheet material in which longitudinally oriented fibers and transversely oriented fibers are stacked, the sheet material has openings surrounded by the longitudinally oriented fibers and the transversely oriented fibers, and an average opening area of the sheet material is more than 0 $mm^2$/piece and 0.7 $mm^2$/piece or less.

The mat material of the present invention includes, as the sheet material, a stacked sheet material in which longitudinally oriented fibers and transversely oriented fibers are stacked, so that the anisotropy in tensile strength of the sheet material can be reduced. Thus, the mat material is configured to have stable wrapping properties within standard values.

In the mat material of the present invention, the sheet material includes openings surrounded by the longitudinally oriented fibers and the transversely oriented fibers. Yet, the adhesion between the sheet material and the mat material is high because the average opening area of the sheet material is more than 0 $mm^2$/piece and 0.7 $mm^2$/piece or less. This makes it possible to prevent or reduce cracking in the mat material at the time of wrapping.

In the mat material of the present invention, when the average opening area of the sheet material is more than 0.7 $mm^2$/piece, it is difficult to prevent or reduce cracking in the mat material at the time of wrapping.

In the mat material of the present invention, preferably, the angle between the orientation direction of the longitudinally oriented fibers and the orientation direction of the transversely oriented fibers is 60° or more and 120° or less.

This makes it possible to further reduce the anisotropy in tensile strength of the sheet material, so that the mat material is configured to have more stable wrapping properties.

In the mat material of the present invention, preferably, the sheet material has an opening ratio of more than 0% and 40% or less.

This makes it possible to more effectively prevent or reduce cracking in the mat material at the time of wrapping.

In the mat material of the present invention, when the opening ratio of the sheet material is more than 40%, cracking in the mat material at the time of wrapping may not be effectively prevented or reduced.

In the mat material of the present invention, preferably, the sheet material is made of at least one of an organic substance or an inorganic substance.

This makes it possible to more effectively prevent or reduce cracking of the mat material at the time of wrapping.

More preferably, the sheet material is made of an organic substance.

This makes it possible to further effectively prevent or reduce cracking of the mat material at the time of wrapping.

In the mat material of the present invention, a preferred material of the sheet material is polyethylene terephthalate, polyethylene, or polypropylene.

This makes it possible to more effectively prevent or reduce cracking of the mat material at the time of wrapping.

In the mat material of the present invention, preferably, the base mat further contains at least one of an inorganic binder or an organic binder.

The base mat containing an inorganic binder can have a higher holding force for holding the exhaust gas treatment body or the like.

The base mat containing an organic binder can prevent scattering of the inorganic fibers in the base mat.

The exhaust gas purification apparatus of the present invention includes: an exhaust gas treatment body through which exhaust gas passes; a holding sealing material wrapped around an outer periphery of the exhaust gas treatment body; and a casing for housing the exhaust gas treatment body around which the holding sealing material is wrapped, wherein the holding sealing material is the mat material of the present invention.

As described above, cracking in the mat material of the present invention at the time of wrapping can be prevented or reduced. Thus, the exhaust gas purification apparatus of the present invention can prevent leakage of untreated exhaust gas from a crack in the mat material.

The method of producing a mat material of the present invention includes: a base mat preparation step of preparing a base mat containing inorganic fibers and having a first main surface and a second main surface; a sheet material preparation step of preparing a sheet material; and a sheet material placement step of placing the sheet material on at least one of the first main surface or the second main surface of the base mat, wherein the sheet material is a stacked sheet material in which longitudinally oriented fibers and transversely oriented fibers are stacked, the sheet material includes openings surrounded by the longitudinally oriented fibers and the transversely oriented fibers, and an average opening area of the sheet material is more than 0 $mm^2$/piece and 0.7 $mm^2$/piece or less.

The method of producing a mat material of the present invention uses, as the sheet material, a stacked sheet material in which longitudinally oriented fibers and transversely oriented fibers are stacked, so that the anisotropy in tensile strength of the sheet material can be reduced. Thus, the method can produce many mat materials each having wrapping properties within standard values from a single large laminated body.

In the method of producing a mat material of the present invention, the sheet material includes openings surrounded by the longitudinally oriented fibers and the transversely oriented fibers. Yet, since the average opening area of the sheet material is more than 0 $mm^2$/piece and 0.7 $mm^2$/piece or less, the sheet material can be placed in closer contact with the base mat, so that cracking in the mat material at the time of wrapping can be prevented or reduced.

In the method of producing a mat material of the present invention, when the average opening area of the sheet material is more than 0.7 mm²/piece, it is difficult to prevent or reduce cracking in the mat material at the time of wrapping.

DESCRIPTION OF EMBODIMENTS

Hereinafter, the mat material, the exhaust gas purification apparatus, and the method of producing a mat material of the present invention are specifically described. The present invention is not limited to the structures described below, and suitable modifications may be made without departing from the scope of the present invention. The present invention also encompasses a combination of two or more preferred structures of the present invention described below.

The mat material of the present invention includes: a base mat containing inorganic fibers and having a first main surface and a second main surface; and a sheet material disposed on at least one of the first main surface or the second main surface, wherein the sheet material is a stacked sheet material in which longitudinally oriented fibers and transversely oriented fibers are stacked, the sheet material has openings surrounded by the longitudinally oriented fibers and the transversely oriented fibers, and an average opening area of the sheet material is more than 0 mm²/piece and 0.7 mm²/piece or less.

Figure 1:
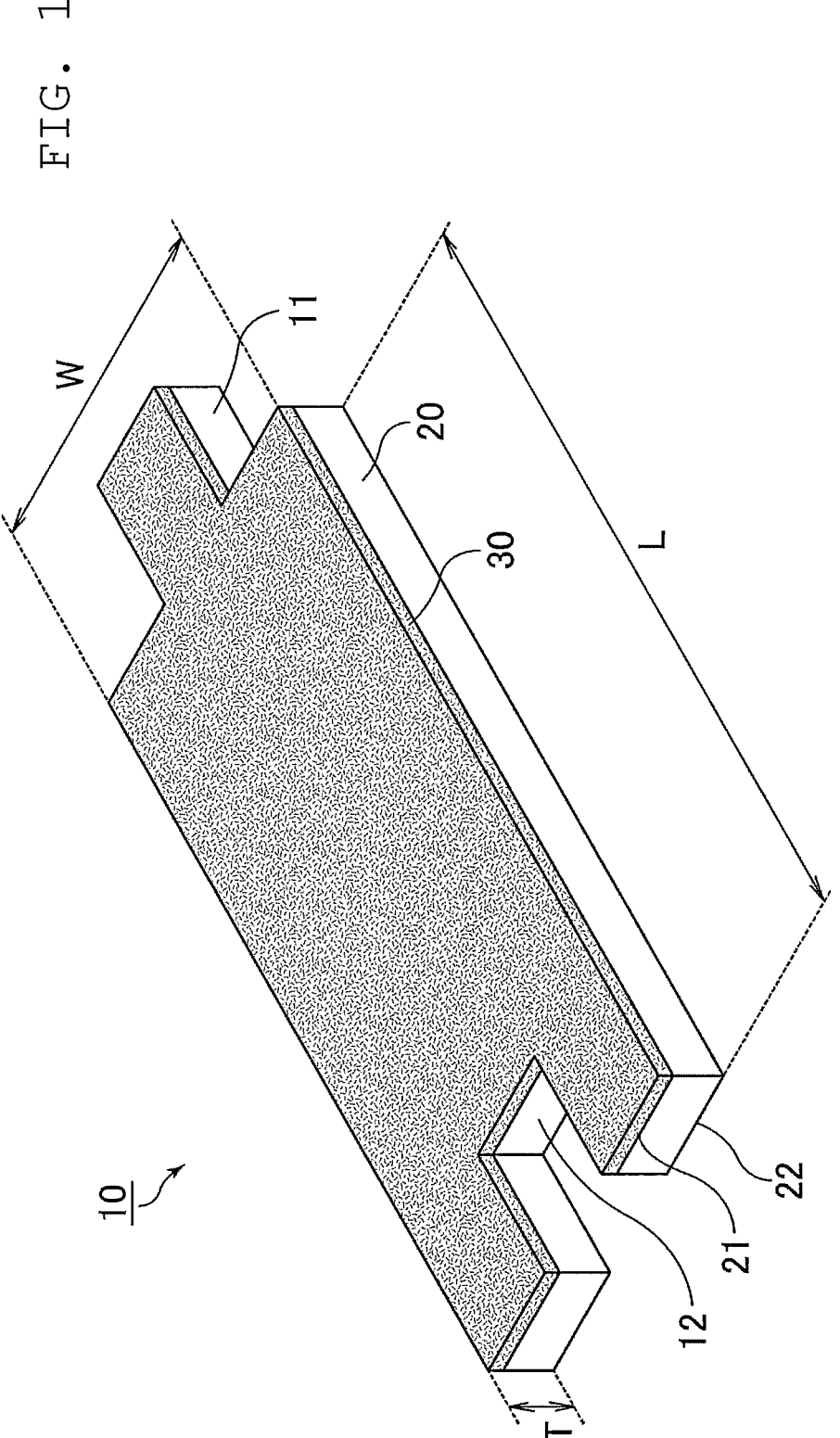
FIG. 1 is a schematic perspective view of an example of a mat material.

FIG. 1 is a schematic perspective view of an example of the mat material.

A mat material 10 shown in FIG. 1 has a structure in which a sheet material 30 is stacked on a first main surface 21 of a base mat 20 having the first main surface 21 and a second main surface 22.

The mat material 10 has ends in its long-side direction (the direction indicated by a double-headed arrow L in FIG. 1). A projection 11 is formed at one end (a first end), and a recess 12 is formed at the other end (a second end).

The projection 11 is formed as a result of overlapping of a projection formed on the base mat 20 and a projection formed on the sheet material 30. The recess 12 is formed as a result of overlapping of a recess formed on the base mat 20 and a recess formed on the sheet material 30.

The projection and the recess of the mat material have shapes that perfectly fit each other when the mat material is wrapped around an exhaust gas purification apparatus, an exhaust gas treatment body, or an exhaust pipe each having a cylindrical outer periphery.

The direction indicated by a double-headed arrow W in FIG. 1 is a short-side direction of the mat material, and the direction indicated by a double-headed arrow T is a thickness direction of the mat material.

FIG. 1 shows a case where the sheet material 30 is placed on only the first main surface 21 of the base mat 20, but the sheet material 30 may be placed on each of the first main surface 21 and the second main surface 22 of the base mat 20. The sheet material 30 may also be placed on a side surface of the base mat 20, in addition to the first main surface 21 and/or the second main surface 22 of the base mat 20.

Figure 2:
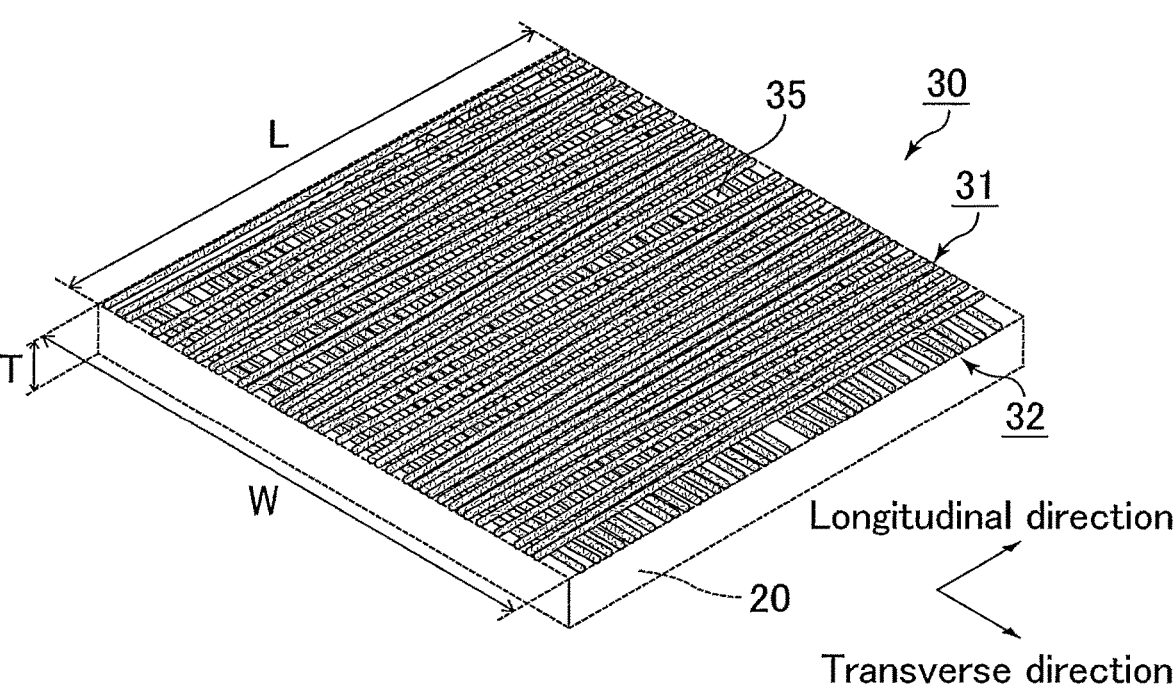
FIG. 2 is a schematic enlarged perspective view of a sheet material shown in FIG. 1.
Figure 3:
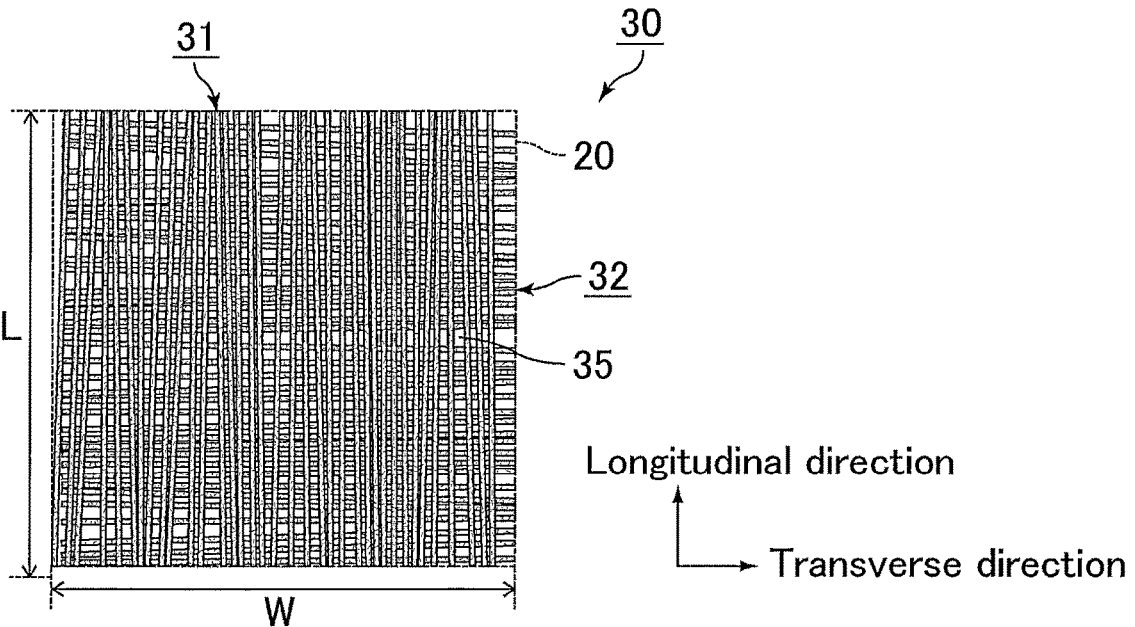
FIG. 3 is a plan view of the sheet material shown in FIG. 2.
Figure 4:
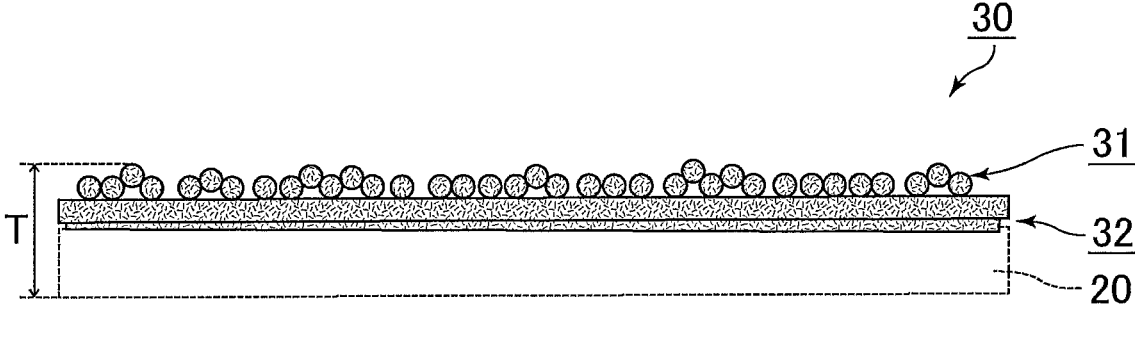
FIG. 4 is a side view of the sheet material shown in FIG. 2.

FIG. 2 is a schematic enlarged perspective view of a sheet material shown in FIG. 1. FIG. 3 is a plan view of the sheet material shown in FIG. 2. FIG. 4 is a side view of the sheet material shown in FIG. 2.

In FIG. 2 to FIG. 4, the base mat 20 is shown in a dotted line in order to show the layout of the sheet material 30 and the base mat 20.

As shown in FIG. 2 to FIG. 4, the sheet material 30 is a stacked sheet material in which longitudinally oriented fibers 31 and transversely oriented fibers 32 are stacked.

The orientation direction of the longitudinally oriented fibers 31 is a longitudinal direction and is parallel to the long-side direction (the direction indicated by a double-headed arrow L) of the mat material 10.

The orientation direction of the transversely oriented fibers 32 is a transverse direction and is parallel to the short-side direction (the direction indicated by a double-headed arrow W) of the mat material 10.

FIG. 2 to FIG. 4 each show an example case where the angle between the orientation direction of the longitudinally oriented fibers 31 and the orientation direction of the transversely oriented fibers 32 is approximately 90°.

The sheet material 30 is a non-woven fabric with longitudinal and transverse fiber orientations in which the longitudinally oriented fibers 31 oriented (arranged) in the longitudinal direction and the transversely oriented fibers 32 oriented (arranged) in the transverse direction are stacked.

The sheet material 30 is produced by a production process in which fibers are directly spun from a raw material. The spun fibers are stretched in the longitudinal direction and the transverse direction, so that long filaments are uniformly oriented (arranged) in the longitudinal direction and the transverse direction of the sheet material 30.

The sheet material 30 has a high uniformity in basis weight because the fibers are aligned in an oriented manner. The sheet material 30 also has a smooth structure because not many fibers are overlapped with each other.

The longitudinally oriented fibers 31 and the transversely oriented fibers 32 are bonded to each other.

The longitudinally oriented fibers 31 and the transversely oriented fibers 32 may be bonded by any method, such as a water jet method, a needle punch method, a through-air method, a hot embossing method, an adhesive bonding method, a stitch-bonding method, an ultrasonic sealing method, or an induction-heat sealing method.

As shown in FIG. 2 and FIG. 3, the sheet material 30 is a see-through non-woven fabric and includes openings 35 surrounded by the longitudinally oriented fibers 31 and the transversely oriented fibers 32.

As shown in FIG. 3, each opening 35 has a substantially square or rectangular shape which is defined by the longitudinally oriented fibers 31 and the transversely oriented fibers 32.

FIG. 2 to FIG. 4 each show a case where a single layer of the longitudinally oriented fibers 31 and a single layer of the transversely oriented fibers 32 are stacked. However, the number of layers of the longitudinally oriented fibers 31 and the transversely oriented fibers 32 to be laminated is not limited, and a total of three or more layers of the longitudinally oriented fibers 31 and the transversely oriented fibers 32 may be alternately laminated.

FIG. 2 to FIG. 4 each show a case where a layer of the longitudinally oriented fibers 31 and a layer of the transversely oriented fibers 32 are stacked in the stated order from the base mat 20 side. However, a layer of the transversely oriented fibers 32 and a layer of the longitudinally oriented fibers 31 may be laminated in the stated order from the base mat 20 side.

Hereinafter, these structures are described in detail.

The base mat constituting the mat material of the present invention includes inorganic fibers. Any inorganic fibers, such as alumina-silica fibers, alumina fibers, or silica fibers, may be used. Glass fibers or biosoluble fibers may also be used. Fibers may be selected depending on properties required for the mat material, such as heat resistance and wind erosion-resistance. Use of large-diameter fibers and long fibers compatible with country-specific environmental regulations is preferred.

Of these, inorganic fibers including low-crystalline alumina are preferred, and inorganic fibers including low-crystalline alumina having a mullite composition are more preferred. In addition, inorganic fibers including spinel-type compounds are still more preferred.

The base mat has a long-side direction which is a wrapping direction, and a short-side direction perpendicular to the long-side direction.

The base mat has ends in its long-side direction. Preferably, a projection is formed at one end (a first end), and a recess is formed at the other end (a second end). Preferably, the projection and the recess of the base mat have shapes that perfectly fit each other when the base mat is wrapped around an exhaust gas purification apparatus, an exhaust gas treatment body, or an exhaust pipe each having a cylindrical periphery.

The base mat may have a shape without a projection and a recess.

Preferably, the base mat has a thickness of 2 to 30 mm.

A base mat having a thickness of less than 2 mm has poor thermal insulation and soundproofing properties because it is too thin. In contrast, a base mat having a thickness of more than 30 mm has poor flexibility and is poorly placed on a member on which the base mat is intended to be placed ¥.

The bulk density of the base mat is not limited but is preferably 0.05 to 0.30 g/cm$^3$.

When the base mat has a bulk density of less than 0.05 g/cm$^3$, the inorganic fibers are loosely entangled and easily separated. This makes it difficult to maintain the shape of the base mat in a predetermined shape. The base mat having a bulk density of more than 0.30 g/cm$^3$ is hard and poorly placed to a member to which the base mat is intended to be placed. Such a base mat is easily breakable.

The sheet material constituting the mat material of the present invention is a stacked sheet material in which longitudinally oriented fibers and transversely oriented fibers are stacked.

Thus, the sheet material has similar properties in each of the longitudinal direction and the transverse direction and can exhibit isotropic tensile strength. As a result, the mat material of the present invention is a mat material configured to have stable wrapping properties within standard values.

The direction aligned with a length direction of fibers constituting the longitudinally oriented fibers is the orientation direction of the longitudinally oriented fibers, and the direction aligned with a length direction of fibers constituting the transversely oriented fibers is the orientation direction of the transversely oriented fibers.

Preferably, the fibers constituting the longitudinally oriented fibers and the fibers constituting the transversely oriented fibers are long filaments.

The long filaments preferably have a length longer than the usual length of staple fibers (e.g., 10 to 50 mm). The average filament length is preferably longer than 100 mm, more preferably several hundred millimeters or longer.

The long filaments may be long continuous fibers.

In the major constituent filaments, the fibers constituting the longitudinally oriented fibers and the fibers constituting the transversely oriented fibers have an average fiber diameter of usually 10 μm or less, preferably around 5 μm.

The sheet material has openings surrounded by the longitudinally oriented fibers and the transversely oriented fibers. In other words, in a plan view, the sheet material includes numerous gaps where both the longitudinally oriented fibers and the transversely oriented fibers are absent.

The openings of the sheet material may have any shape. Yet, a substantially square or rectangular shape is preferred.

Among the many openings in the sheet material, there may be openings having different shapes.

When the sheet material has large openings, the adhesion between the sheet material and the base mat is poor, causing cracking in the mat material at the time of wrapping. Thus, the openings of the sheet material are preferably as small as possible.

Specifically, the average opening area of the sheet material is more than 0 mm$^2$/piece and 0.7 mm$^2$/piece or less.

This increases the adhesion between the sheet material and the base mat, which can prevent or reduce cracking in the mat material at the time of wrapping.

The average opening area of the sheet material is preferably 0.0001 mm$^2$/piece or more and 0.5 mm$^2$/piece or less, more preferably 0.0001 mm$^2$/piece or more and 0.1 mm$^2$/piece or less, still more preferably 0.0001 mm$^2$/piece or more and 0.01 mm$^2$/piece or less.

The average opening area of the sheet material can be calculated as follows.

An enlarged photo of the sheet material is taken with a microscope, and the enlarged photo is imported into any drawing software. Then, a rectangle approximating each opening of the sheet material is drawn, and the rectangle is compared to a reference rectangle with a known area, whereby the area of the opening is calculated.

The average area of all the openings calculated is regarded as the average opening area (average area per opening) of the sheet material.

Preferably, the sheet material has a planar shape that is substantially the same as that of the base mat. In other words, in a plan view, preferably, the sheet material substantially overlaps the region where the base mat is arranged.

Preferably, the sheet material is attached to the base mat. The sheet material may be attached to the base mat, for example, with an adhesive. The sheet material itself may also be bonded to the base mat by thermocompression (e.g., thermal lamination) without using an adhesive.

The basis weight of the sheet material is not limited, but is preferably 5 g/m$^2$ or more and 100 g/m$^2$ or less, more preferably 5 g/m$^2$ or more and 50 g/m$^2$ or less, still more preferably 5 g/m$^2$ or more and 30 g/m$^2$ or less.

The terms "basis weight of the sheet material" herein refers to the basis weight per sheet material.

The angle between the orientation direction of the longitudinally oriented fibers and the orientation direction of the transversely oriented fibers is not limited, but it is preferably 60° or more and 120° or less, more preferably 70° or more and 110° or less, still more preferably 80° or more and 100° or less, particularly preferably substantially 90°.

The angle between the orientation direction of the longitudinally oriented fibers and the orientation direction of the transversely oriented fibers can be calculated as follows.

An enlarged photo of the sheet material is taken with a microscope, and the enlarged photo is imported into any drawing software. Then, a rectangle approximating each opening of the sheet material is drawn, and the angle of the opening is calculated, whereby the angle between the orientation direction of the longitudinally oriented fibers and the orientation direction of the transversely oriented fibers is calculated.

The relationship of the orientation directions of the longitudinally oriented fibers and the transversely oriented fibers with respect to the long-side direction and the short-side direction of the mat material is not limited. Preferably, the orientation direction of one of the longitudinally oriented fibers or the transversely oriented fibers is parallel to the long-side direction of the mat material, and the orientation direction of the other of the longitudinally oriented fibers or the transversely oriented fibers is parallel to the short-side direction of the mat material.

The opening ratio of the sheet material is preferably more than 0% and 40% or less, more preferably 5% or more and 30% or less, still more preferably 10% or more and 25% or less.

The opening ratio of the sheet material can be calculated by calculating each opening area by the procedure for measuring the average opening area of the sheet material and determining the ratio (percentage) of the total area of all the openings calculated to the area of the sheet material in its enlarged photo.

Preferably, the sheet material is made of at least one of an organic substance or an inorganic substance.

For example, the longitudinally oriented fibers may include organic fibers and/or inorganic fibers, and the transversely oriented fibers may include organic fibers and/or inorganic fibers. The longitudinally oriented fibers and the transversely oriented fibers may include different materials. Yet, usually, when the longitudinally oriented fibers include organic fibers, the transversely oriented fibers also include organic fibers; and when the longitudinally oriented fibers include inorganic fibers, the transversely oriented fibers also include inorganic fibers.

More preferably, the sheet material is made of an organic substance.

For example, both the longitudinally oriented fibers and the transversely oriented fibers may include organic fibers.

More specifically, examples of preferred materials of the sheet material include polyethylene terephthalate (PET), polyethylene (PE), and polypropylene (PP).

In the mat material of the present invention, preferably, the base mat further includes at least one of an inorganic binder or an organic binder.

The amount of the inorganic binder used (weight of inorganic binder/weight of mat material) may be more than 0 wt % and 15 wt % or less, for example.

The amount of the organic binder used (weight of organic binder/weight of mat material) may be more than 0 wt % and 15 wt % or less.

The inorganic binder may be alumina sol, silica sol, or the like.

Examples of the organic binder that may be preferably used include water-soluble organic polymers such as acrylic resin, acrylate latex, rubber latex, carboxymethylcellulose, and polyvinyl alcohol; thermoplastic resins such as styrene resin; and thermosetting resins such as epoxy resin.

Subsequently, a method of producing a mat material of the present invention, which is a method that can produce the mat material of the present invention, is described.

The method of producing a mat material of the present invention includes a base mat preparation step of preparing a base mat containing inorganic fibers and having a first main surface and a second main surface; a sheet material preparation step of preparing a sheet material; and a sheet material placement step of placing the sheet material on at least one of the first main surface or the second main surface of the base mat, wherein the sheet material is a stacked sheet material in which longitudinally oriented fibers and transversely oriented fibers are stacked, the sheet material includes openings surrounded by the longitudinally oriented fibers and the transversely oriented fibers, and an average opening area of the sheet material is more than 0 mm$^2$/piece and 0.7 mm$^2$/piece or less.

In the method of producing a mat material of the present invention, preferably, two types of mat materials are produced. The two types of mat materials include a first mat material and a second mat material. Each mat material is the mat material of the present invention.

In the method of producing a mat material of the present invention, first, a base mat including a first main surface and a second main surface, and a sheet material are prepared.

The structures and physical properties of the base mat and the sheet material prepared here are the same as those of the base mat and the sheet material described above for the mat material of the present invention. Thus, detailed description thereof is omitted.

Preferably, the base mat and the sheet material prepared here are large sheets from which many mat materials of the present invention can be obtained by the punching process.

The base mat can be obtained by various methods. For example, it can be produced by a papermaking method or a needling method.

In the case of the papermaking method, for example, the base mat can be produced in the following manner.

Inorganic fibers are spread, and the spread inorganic fibers are dispersed in a solvent to obtain a mixture. The mixture is poured into a mold having a mesh for filtering at the bottom, and the solvent in the mixture is removed, whereby an inorganic fiber aggregate is obtained. The inorganic fiber aggregate is then dried, whereby a base mat can be obtained.

In the case of the needling method, for example, the base mat can be produced in the following manner.

A spinning mixture containing an aqueous basic aluminum chloride solution, silica sol, and the like as raw materials is spun by a blowing method, whereby an inorganic fiber precursor having an average fiber diameter of 3 to 10 μm is produced. Subsequently, the inorganic fiber precursor is compressed to produce a continuous base mat having a predetermined size, followed by firing, whereby a base mat is obtained. Needle punching is performed before or after the firing to entangle the inorganic fibers with each other.

The sheet material can be produced by the following method, for example.

First, a raw material (e.g., resin) is subjected to melt spinning by a spinning device for non-woven fabrics such as a melt blown nonwoven fabric and a spunbond nonwoven fabric. Subsequently, the fibers are aligned and stretched in the machine direction (MD) and the cross direction (CD), whereby a longitudinally stretched web is produced in which a continuous body consisting of long fiber filaments is stretched in the machine direction and a transversely stretched web in which a continuous body similarly consisting of long filaments is stretched in the cross direction. Then, the longitudinally stretched web and the transversely stretched web are stacked and bonded together, whereby a sheet material (a stacked sheet material) is produced in which longitudinally oriented fibers and transversely oriented fibers are stacked.

The longitudinally stretched web and the transversely stretched web may be bonded by a method such as a water jet method, a needle punch method, a through-air method, a hot embossing method, an adhesive bonding method, a stitch-bonding method, an ultrasonic sealing method, or an induction-heat sealing method, as described above.

The sheet material produced as described above has openings surrounded by the longitudinally oriented fibers and the transversely oriented fibers, and the average opening area of the sheet material is more than 0 mm²/piece and 0.7 mm²/piece or less.

Next, the sheet material is placed on at least one of the first main surface or the second main surface of the base mat.

At this point, preferably, a large sheet material is attached to a large base mat to obtain a laminated body.

The attachment may be performed with an adhesive, or may be performed by bonding the sheet material itself by thermocompression (e.g., thermal lamination) without using an adhesive.

Figure 5:
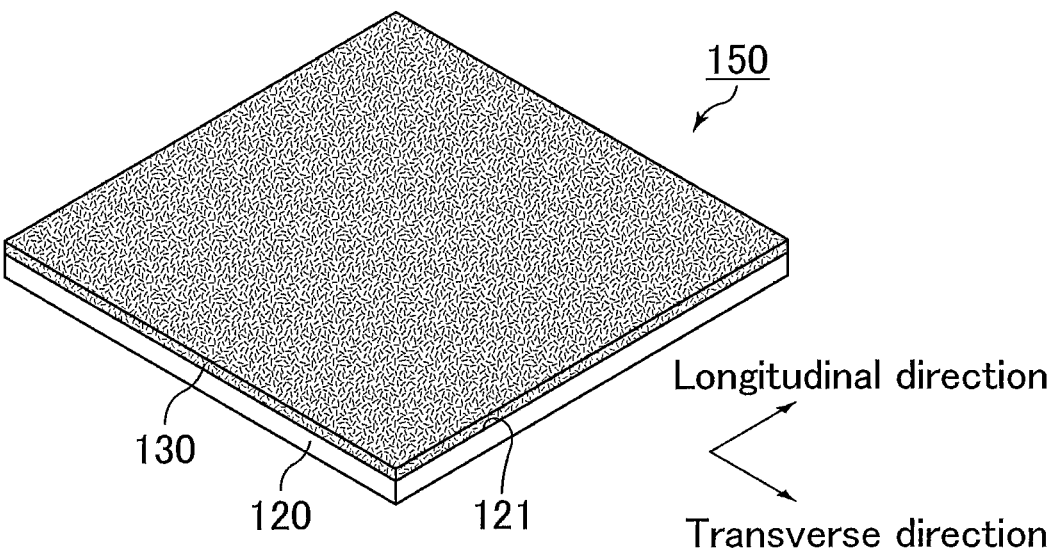
FIG. 5 is a schematic perspective view of an example of a laminated body.

FIG. 5 is a schematic perspective view of an example of the laminated body.

A laminated body 150 includes a large sheet material 130 attached to a first main surface 121 of a large base mat 120. It is a rectangular sheet having two vertical sides and two horizontal sides.

The sheet material 130 is a stacked sheet material in which longitudinally oriented fibers and transversely oriented fibers are stacked. The orientation direction of the longitudinally oriented fibers of the sheet material 130 is the longitudinal direction and is parallel to the two vertical sides of the laminated body 150. The orientation direction of the transversely oriented fibers of the sheet material 130 is the transverse direction and is parallel to the two horizontal sides of the laminated body 150.

In the sheet material 130, a particularly preferred angle between the orientation direction of the longitudinally oriented fibers and the orientation direction of the transversely oriented fibers is generally 90°, but the angle is not limited.

In order to reduce the anisotropy in tensile strength of the sheet material, the angle is preferably 60° or more and 120° or less, more preferably 70° or more and 110° or less, still more preferably 80° or more and 100° or less, particularly preferably substantially 90°.

Subsequently, the laminated body is subjected to the punching process, whereby a mat material having a predetermined shape can be produced.

The method of producing a mat material of the present invention uses, as the sheet material, a stacked sheet material in which longitudinally oriented fibers and transversely oriented fibers are stacked, so that the anisotropy in tensile strength of the sheet material can be reduced, making it possible to produce many mat materials each having wrapping properties within standard values from a single large laminated body.

In the method of producing a mat material of the present invention, the sheet material includes openings surrounded by the longitudinally oriented fibers and the transversely oriented fibers. Yet, since the average opening area of the sheet material is more than 0 mm²/piece and 0.7 mm²/piece or less, the sheet material can be placed in closer contact with the base mat, so that cracking in the mat material at the time of wrapping can be prevented or reduced.

Preferably, the punching process of the laminated body involves a step of obtaining two types of mat materials, i.e., a first mat material and a second mat material. The first mat material is obtained such that the longitudinal direction of the laminated body is the long-side direction of the mat material and that the transverse direction of the laminated body is the short-side direction of the mat material. The second mat material is obtained such that the transverse direction of the laminated body is a long-side direction of the mat material and that the longitudinal direction of laminated body is the short-side direction of the mat material.

Figure 6:
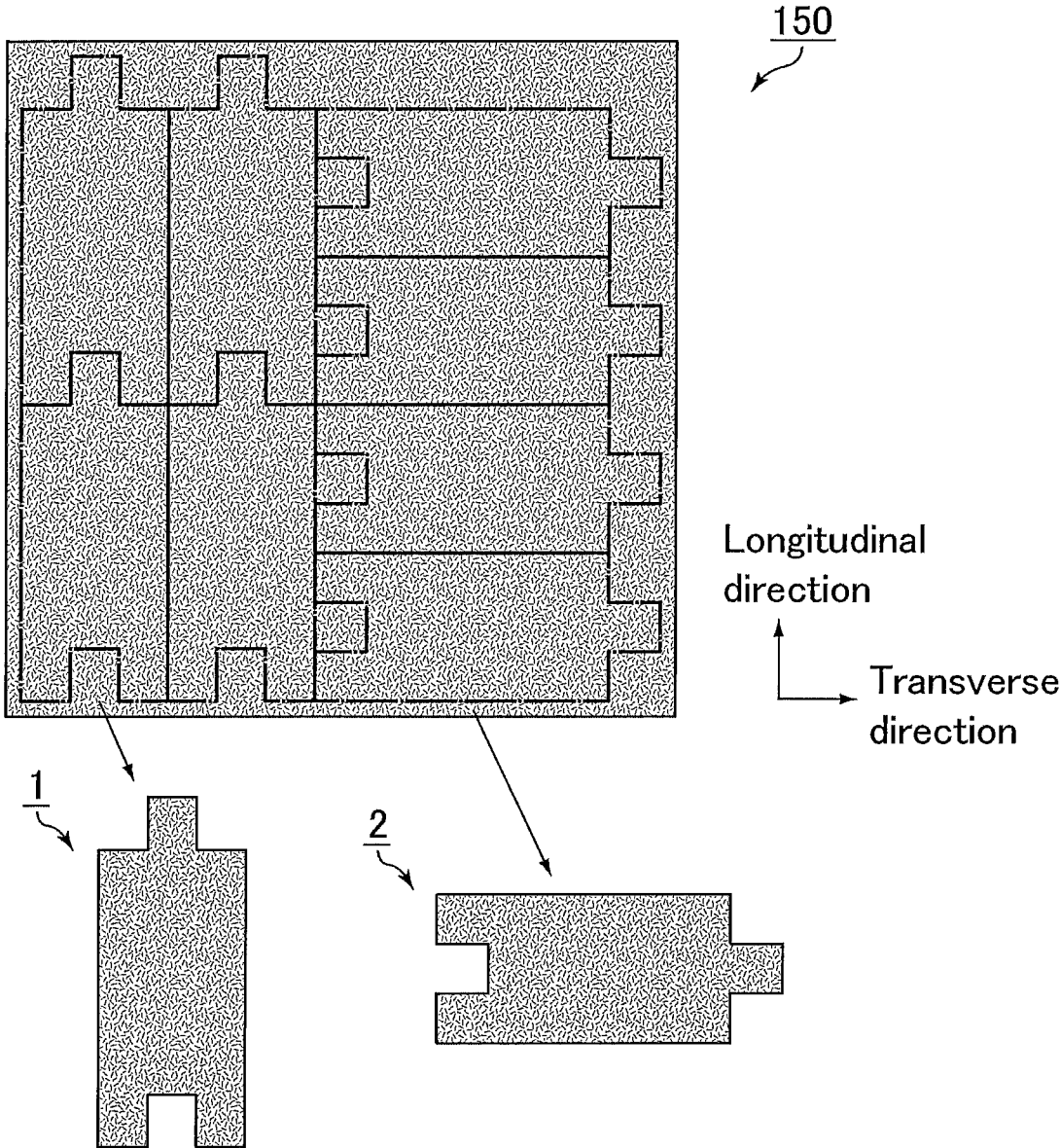
FIG. 6 is a schematic top view of a step of obtaining two types of mat materials by punching process.

FIG. 6 is a schematic top view of a step of obtaining two types of mat materials by the punching process.

The laminated body 150 shown in FIG. 6 is subjected to the punching process, whereby two types of mat materials are obtained.

The left side of FIG. 6 shows that a first mat material 1 is obtained in which the orientation direction of the longitudinally oriented fibers of the sheet material (longitudinal direction shown in FIG. 6) is the long-side direction of the mat material, and the orientation direction of the transversely oriented fibers of the sheet material (transverse direction shown in FIG. 6) is the short-side direction of the mat material.

The right side of FIG. 6 shows that a second mat material 2 is obtained in which the orientation direction of the transversely oriented fibers of the sheet material (transverse direction shown in FIG. 6) is the long-side direction of the mat material, and the orientation direction of the longitudinally oriented fibers of the sheet material (longitudinal direction shown in FIG. 6) is the short-side direction of the mat material.

In the first mat material and the second mat material, the fibers (longitudinally oriented fibers or transversely oriented fibers of the sheet material) which are oriented in the long-side direction of the mat material and the fibers (transversely oriented fibers or longitudinally oriented fibers of the sheet material) which are oriented in the short-side direction of the mat material are equivalent in terms of number and density. Thus, the first mat material and the second mat material show similar tensile strength and wrapping properties. In other words, the first mat material and the second mat material are both obtained as mats having wrapping properties within standard values, with a smallest difference therebetween in terms of wrapping properties.

Thus, the method can produce many mat materials each having wrapping properties within standard values from a single large laminated body.

In the punching process, preferably, the orientation direction of one of the longitudinally oriented fibers and the transversely oriented fibers of the sheet material is parallel to the long-side direction of the first mat material and is also parallel to the short-side direction of the second mat material.

In addition, preferably, the orientation direction of the other of the longitudinally oriented fibers and the transversely oriented fibers of the sheet material is parallel to the short-side direction of the first mat material and is also parallel to the long-side direction of the second mat material.

The punching directions shown in FIG. 6 are the directions that satisfy the above conditions.

As has been described so far, the first mat material and the second mat material are obtained by the method of producing a mat material of the present invention. The wrapping properties of the first mat material and the second mat material are affected by both the orientation direction of the longitudinally oriented fibers of the sheet material and the orientation direction of the transversely oriented fibers of the sheet material.

Since the orientation direction of the longitudinally oriented fibers is different from the orientation direction of the transversely oriented fibers, these orientation directions differently affect the wrapping properties of the mat material.

In each of the first mat material and the second mat material, the wrapping properties of the mat material are not determined solely by the orientation direction of the longitudinally oriented fibers or solely by the orientation direction of the transversely oriented fibers. Thus, the impact from a single orientation direction on the wrapping properties of the mat material is alleviated.

In this manner, the difference in wrapping properties is reduced between the first mat material and the second mat material, which are punched out in different directions, so that both the first mat material and the second mat material can have wrapping properties within standard values.

Hereinafter, the exhaust gas purification apparatus of the present invention is described.

The exhaust gas purification apparatus of the present invention includes an exhaust gas treatment body through which exhaust gas passes; a holding sealing material wrapped around an outer periphery of the exhaust gas treatment body; and a casing for housing the exhaust gas treatment body around which the holding sealing material is wrapped, wherein the holding sealing material is the mat material of the present invention.

As described above, cracking in the mat material of the present invention at the time of wrapping can be prevented or reduced. Thus, the exhaust gas purification apparatus of the present invention can prevent leakage of untreated exhaust gas from a crack in the mat material (the holding sealing material).

Figure 7:
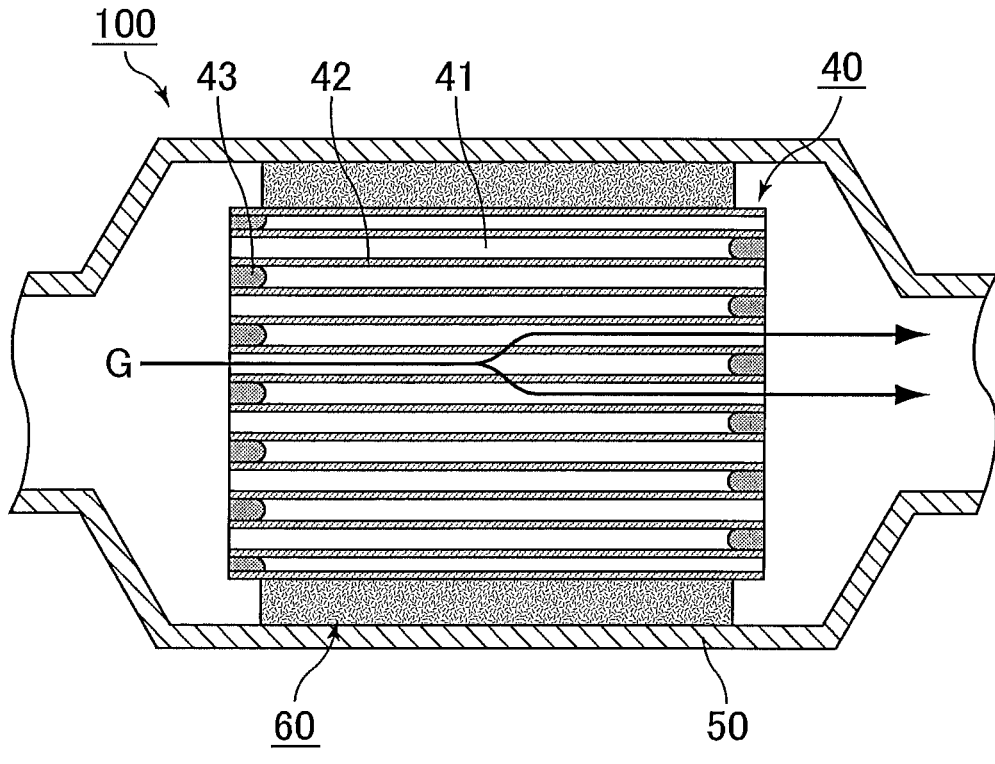
FIG. 7 is a schematic cross-sectional view of an example of an exhaust gas purification apparatus of the present invention.

FIG. 7 is a schematic cross-sectional view of an example of the exhaust gas purification apparatus of the present invention.

As shown in FIG. 7, an exhaust gas purification apparatus 100 of the present invention includes a casing 50, an exhaust gas treatment body 40 which is housed in the casing 50 and through which exhaust gas passes, and a holding sealing material 60 which is arranged between the exhaust gas treatment body 40 and the casing 50 and configured to hold the exhaust gas treatment body 40.

The holding sealing material 60 is a mat material wrapped around an outer periphery of the exhaust gas treatment body.

The exhaust gas treatment body 40 has a pillar shape in which many cells 41 are arranged in parallel in a longitudinal direction, with a cell wall 42 between the cells. Each cell is plugged at one end with a plug 43.

If necessary, to an end of the casing 50 are connected an inlet tube for introducing exhaust gas discharged from an internal combustion engine, and an outlet tube for discharging the exhaust gas that has passed through the exhaust gas purification apparatus to the outside.

Passage of exhaust gas through the exhaust gas purification apparatus 100 having the above-described configuration is described below with reference to FIG. 7.

As shown in FIG. 7, exhaust gas that is discharged from the internal combustion engine and that flowed into exhaust gas purification apparatus 100 (in FIG. 7, the exhaust gas is indicated by G, and the flow of exhaust gas is indicated by arrows) flows into one of the cells 41 that are open at an exhaust gas inlet-side end face of the exhaust gas treatment body (honeycomb filter) 40, and then passes through the cell wall 42 between the cells 41. Here, PM in the exhaust gas is collected by the cell wall 42, and the exhaust gas is purified. The purified exhaust gas flows out from another cell 41 that is open at an exhaust gas outlet-side end face and is discharged to the outside.

In the exhaust gas purification apparatus 100 shown in FIG. 7, the holding sealing material 60 is the mat material of the present invention. At least one of a first main surface or a second main surface of the holding sealing material 60 includes the sheet material (the stacked sheet material in which longitudinally oriented fibers and transversely oriented fibers are stacked) constituting the mat material of the present invention.

Any heat-resistant metal can be used as a material of the casing constituting the exhaust gas purification apparatus of the present invention. Specific examples include metals such as stainless steel, aluminum, and iron.

A suitable shape of the casing is, for example, a substantially cylindrical shape, a clam-shell shape, a shape with a substantially elliptical cross-section, a shape with a substantially polygonal cross-section, or the like.

The exhaust gas treatment body 40 shown in FIG. 7 is a filter in which each cell 41 is plugged at one end with the plug 43. However, in the exhaust gas treatment body constituting the exhaust gas purification apparatus of the present invention, each cell may not necessarily be plugged at one end. Such an exhaust gas treatment body can be suitably used as a catalyst carrier.

The exhaust gas treatment body 40 may include a porous non-oxide ceramic material such as silicon carbide or silicon nitride, or may include a porous oxide ceramic material such as alumina, cordierite, or mullite. Of these, silicon carbide is preferred.

The density of the cells in a cross section of the exhaust gas treatment body 40 is not limited, but a preferred lower limit is 31.0 pcs/cm$^2$ (200 pcs/inch$^2$), and a preferred upper limit is 93.0 pcs/cm$^2$ (600 pcs/inch$^2$). A more preferred lower limit is 38.8 pcs/cm$^2$ (250 pcs/inch$^2$), and a more preferred upper limit is 77.5 pcs/cm$^2$ (500 pcs/inch$^2$).

The exhaust gas treatment body 40 may support a catalyst for conversion of exhaust gas. Preferred examples of catalysts to be supported include noble metals such as platinum, palladium, and rhodium. Of these, platinum is more preferred. Examples of other catalysts that can be used include alkali metals such as potassium and sodium and alkaline-earth metals such as barium. Each of these catalysts may be used alone or in combination of two or more thereof.

These catalysts, when supported, facilitate removal of PM by combustion and allow conversion of toxic exhaust gas.

EXAMPLES

An example that more specifically discloses the present invention is described below. The present invention is not limited to the following example.

Example 1

A large base mat including inorganic fibers (mullite fibers) with a basis weight (fiber weight per unit area) of 2400 g/m² was produced by a papermaking method.

As a large sheet material, a stacked sheet material (a non-woven fabric) with longitudinal and transverse fiber orientations was prepared in which longitudinally oriented PET fibers oriented in a longitudinal direction and transversely oriented PET fibers oriented in a transverse direction were laminated. This stacked sheet material is oriented in a direction aligned with a length direction of PET fibers. The angle between the orientation direction of the longitudinally oriented fibers and the orientation direction of the transversely oriented fibers is generally 90°. The sheet material has substantially square or rectangular openings. In addition, this sheet material has a basis weight of 10 g/m².

The base mat and the sheet material were bonded by thermocompression, whereby a rectangular laminated body similar to the laminated body schematically shown in FIG. 5 was obtained.

The laminated body was subjected to the punching process with the same arrangement schematically shown in FIG. 6, whereby two types of mat materials (a first mat material and second mat material) were obtained.

In the first mat material, the orientation direction of the longitudinally oriented fibers of the sheet material is parallel to the long-side direction of the mat material. In the second mat material, the orientation direction of the transversely oriented fibers of the sheet material is parallel to the long-side direction of the mat material.

Comparative Example 1

A large base mat was produced as in Example 1.

As a large sheet member, a non-woven fabric with randomly oriented PET fibers was prepared. The non-woven fabric is moderately oriented in the machine direction (MD) which is a direction aligned with the length direction of the PET fibers. This sheet member also includes opening having random shapes, such as parallelogram.

The base mat and the sheet material were bonded by thermocompression, whereby a rectangular laminated body having two vertical sides and two horizontal sides was obtained.

The laminated body was subjected to the punching process as in Example 1, whereby two types of mat materials (a first mat material and a second mat material) were obtained.

In the first mat material, the length direction of the PET fibers of the sheet material is parallel to the long-side direction of the mat material. In the second mat material, the length direction of the PET fibers of the sheet material is parallel to the short-side direction of the mat material.

Figure 8:
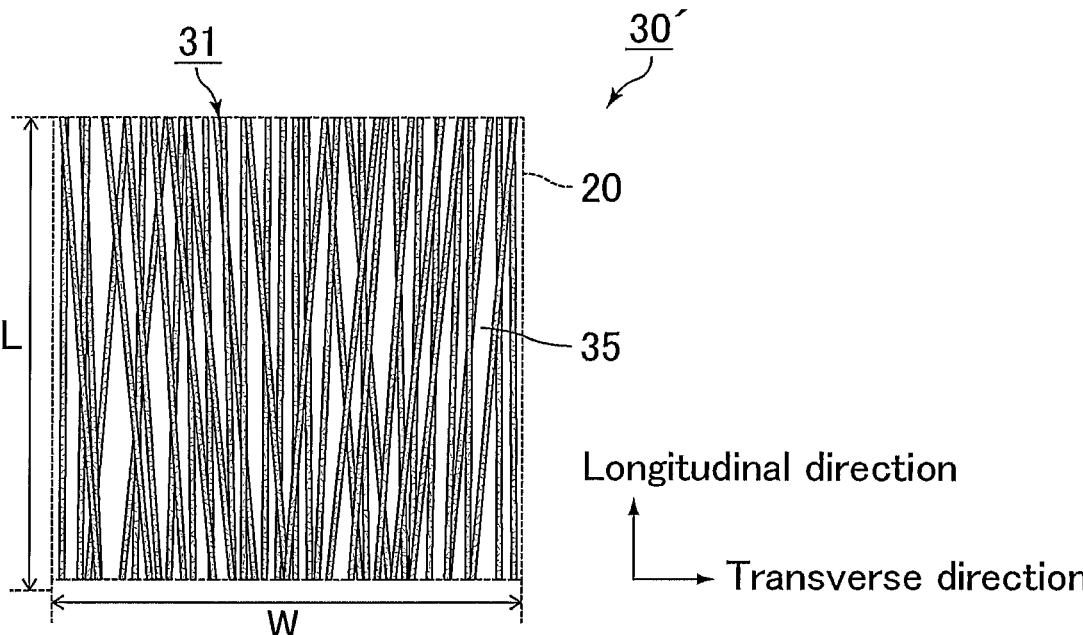
FIG. 8 is a schematic enlarged plan view of a sheet material of Comparative Example 1.

FIG. 8 is a schematic enlarged plan view of the sheet material of Comparative Example 1.

A sheet material 30' of Comparative Example 1 includes the longitudinally oriented fibers 31 but does not include transversely oriented fibers. Each opening 35 is formed by being surrounded by the longitudinally oriented fibers 31.

Comparative Example 2

A large base mat was produced as in Example 1.

To provide a large sheet material, a sheet material was prepared by stacking a longitudinal web with a longitudinal fiber orientation obtained by splitting a polyolefin film stretched in the machine direction and a transverse web with a transverse fiber orientation obtained by splitting a polyolefin film stretched in the cross direction, and thermally fusing the stack. The sheet material has substantially square or rectangular openings.

The base mat and the sheet material were bonded together by thermocompression, whereby a rectangular laminated body having two vertical sides and two horizontal sides was obtained.

The laminated body was subjected to the punching process as in Example 1, whereby two types of mat materials (a first mat material and a second mat material) were obtained.

In the first mat material, the orientation direction (longitudinal direction) of the longitudinal web of the sheet material is parallel to the long-side direction of the mat material. In the second mat material, the orientation direction (transverse direction) of the transverse web of the sheet material is parallel to the long-side direction of the mat material.

(Measurement of Average Opening Area and Opening Ratio)

An enlarged photo of each of the sheet materials used in Example 1 and Comparative Example 2 was taken with a microscope.

The enlarged photo of the sheet material was imported into a drawing software. Then, a rectangle approximating each opening of the sheet material was drawn, and the rectangle was compared to a reference rectangle with a known area, whereby the area of the opening was calculated.

The average area of all the openings calculated was regarded as the average opening area (average area per opening) of the sheet material.

The ratio (percentage) of the total area of all the openings calculated to the area of the sheet material in the enlarged photo was regarded as the opening ratio.

Table 1 shows the results.

(Wrapping Test)

Each of the two types of mat materials (the first mat material and the second mat material) produced in each of the example and the comparative examples was wrapped around a φ200-mm cylindrical base body.

Each mat material was wrapped such that the base mat was facing the base body and the sheet material was facing the outside.

The total length including the longitudinal dimension of the mat material (mat dimension) and the dimension of a gap (seam gap) between the projection and the recess at a position where the projection and the recess fit each other when the mat material was wrapped was measured.

The total length was measured for each of the two types of mat materials, and the difference in the total length (difference between the first mat material and the second mat material) was calculated.

Table 1 shows the results.

The results of "Difference" were rated as good or no good.

The smaller the difference between the first mat material and the second mat material, the more uniform the mat materials are.

(Presence or Absence of Cracking in Mat Material)

Each of the two types of mat materials produced in each of the example and the comparative examples was checked for whether cracking occurred after the wrapping test.

Table 1 shows the results.

Regarding the results of "Presence or absence of cracking", "good" indicates that no cracking occurred, and "no good" indicates that cracking occurred.

TABLE 1

| | Sheet material | | | | Sheet material + base mat | | | Sheet material + | |
| | (nonwoven fabric) | | | Type of mat | Mat | | | base mat | |
| | Laminated fibers | Opening shape (substantially) | Average opening area | Opening ratio | material (punching direction) | dimension + seam gap | Difference | Presence or absence of cracking | Compre-hensive judgment |
|---|---|---|---|---|---|---|---|---|---|
| Example 1 | Longitudinally oriented fibers & transversely oriented fibers | Square or rectangular | 0.002 mm²/piece | 21% | First mat material<br>Second mat material | 683.9 mm<br><br>683.8 mm | Good (0.1 mm) | Good (absent) | Good |
| Comparative Example 1 | Randomly oriented fibers | Random (parallelogram, etc.) | — | — | First mat material<br>Second mat material | 687.2 mm<br><br>680.5 mm | No good (6.7 mm) | Good (absent) | No good |
| Comparative Example 2 | Longitudinally oriented fibers & transversely oriented fibers | Square or rectangular | 0.8 mm²/piece | 45% | First mat material<br>Second mat material | 681.6 mm<br><br>681.4 mm | Good (0.2 mm) | No good (present) | No good |

The results shows that the difference in the total length including the mat dimension and the dimension of the seam gap between of the first mat material and the second mat material is reduced with the use of the stacked sheet material in which longitudinally oriented fibers and transversely oriented fibers are stacked.

This means that two types of mat materials having similar wrapping properties are obtained and that many mat materials each having good wrapping properties were obtained from a single large laminated body.

The results also show that cracking in the mat material at the time of wrapping can be prevented when the sheet material has an average opening area of more than 0 mm²/piece and 0.7 mm²/piece or less.

Figure 9:
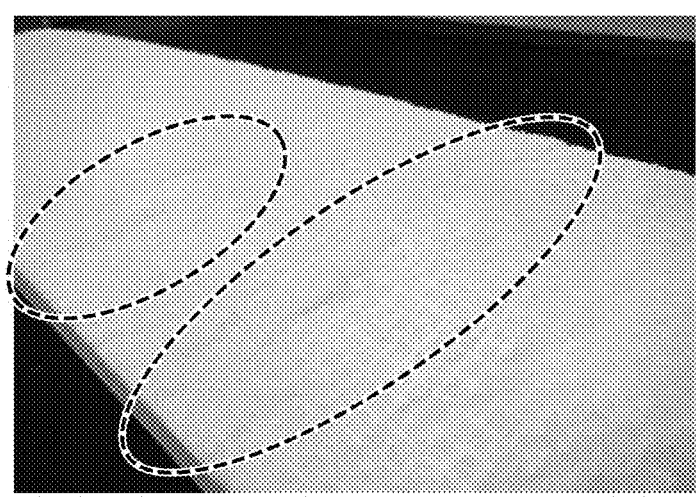
FIG. 9 is a photo of a mat material of Comparative Example 2.

FIG. 9 is a photo of the mat material of Comparative Example 2.

As shown in FIG. 9, the mat material of Comparative Example 2 was cracked at portions each encircled by a dotted line after the wrapping test.

REFERENCE SIGNS LIST 1 first mat material
2 second mat material
10 mat material
11 projection
12 recess
20, 120 base mat
21, 121 first main surface of base mat
22 second main surface of base mat
30, 130 sheet material
31 longitudinally oriented fiber
32 transversely oriented fiber
35 opening
40 exhaust gas treatment body
41 cell
42 cell wall
43 plug
50 casing
60 holding sealing material
100 exhaust gas purification apparatus
150 laminated body

The invention claimed is:

1. A mat material comprising:

a base mat containing inorganic fibers and having a first main surface and a second main surface; and a sheet material disposed on at least one of the first main surface or the second main surface, wherein the sheet material is a stacked sheet material in which longitudinally oriented fibers and transversely oriented fibers are stacked, the sheet material has openings surrounded by the longitudinally oriented fibers and the transversely oriented fibers, an average opening area of the sheet material is more than 0 mm² and 0.7 mm² or less, the sheet material has an opening ratio of 10 to 25%, one or more fibers of the longitudinally oriented fibers are angled relative to other fibers of the longitudinally oriented fibers, one or more fibers of the transversely oriented fibers are angled relative to other fibers of the transversely oriented fibers, and an angle between the orientation direction of the longitudinally oriented fibers and the orientation direction of the transversely oriented fibers is 60° or more and 120° or less.

2. The mat material according to claim 1, wherein the sheet material is made of at least one of an organic substance or an inorganic substance.

3. The mat material according to claim 2, wherein the sheet material is made of an organic substance.

4. The mat material according to claim 1, wherein a material of the sheet material is polyethylene terephthalate, polyethylene, or polypropylene.

5. The mat material according to claim 1, wherein the base mat further includes at least one of an inorganic binder or an organic binder.

6. The mat material according to claim 2, wherein a material of the sheet material is polyethylene terephthalate, polyethylene, or polypropylene.

7. The mat material according to claim 3, wherein a material of the sheet material is polyethylene terephthalate, polyethylene, or polypropylene.

8. The mat material according to claim 2, wherein the base mat further includes at least one of an inorganic binder or an organic binder.

9. The mat material according to claim 3, wherein the base mat further includes at least one of an inorganic binder or an organic binder.

10. An exhaust gas purification apparatus comprising:

an exhaust gas treatment body through which exhaust gas passes;

a holding sealing material wrapped around an outer periphery of the exhaust gas treatment body; and a casing for housing the exhaust gas treatment body around which the holding sealing material is wrapped, wherein the holding sealing material is the mat material according to claim 1.

11. A method of producing a mat material, comprising:

a base mat preparation step of preparing a base mat containing inorganic fibers and having a first main surface and a second main surface;

a sheet material preparation step of preparing a sheet material; and a sheet material placement step of placing the sheet material on at least one of the first main surface or the second main surface of the base mat, wherein the sheet material is a stacked sheet material in which longitudinally oriented fibers and transversely oriented fibers are stacked, the sheet material includes openings surrounded by the longitudinally oriented fibers and the transversely oriented fibers, an average opening area of the sheet material is more than 0 mm$^2$ and 0.7 mm$^2$ or less, the sheet material has an opening ratio of 10 to 25%, one or more fibers of the longitudinally oriented fibers are angled relative to other fibers of the longitudinally oriented fibers, one or more fibers of the transversely oriented fibers are angled relative to other fibers of the transversely oriented fibers, and an angle between the orientation direction of the longitudinally oriented fibers and the orientation direction of the transversely oriented fibers is 60° or more and 120° or less.

12. The method according to claim 11, wherein the sheet material is made of at least one of an organic substance or an inorganic substance.

13. The method according to claim 11, wherein a material of the sheet material is polyethylene terephthalate, polyethylene, or polypropylene.

14. The method according to claim 11, wherein the base mat further includes at least one of an inorganic binder or an organic binder.

\* \* \* \* \*